RE 24955

April 12, 1960     E. P. CAMPBELL     2,932,146
GRASS CATCHER FOR ROTARY MOWERS

Filed Sept. 29, 1958     2 Sheets-Sheet 1

INVENTOR.
EDWIN P. CAMPBELL
BY
Merchant & Merchant
ATTORNEYS

April 12, 1960     E. P. CAMPBELL     2,932,146
GRASS CATCHER FOR ROTARY MOWERS
Filed Sept. 29, 1958     2 Sheets-Sheet 2
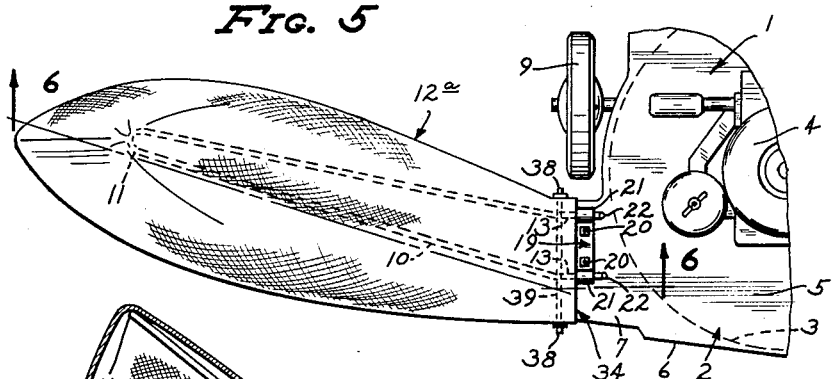
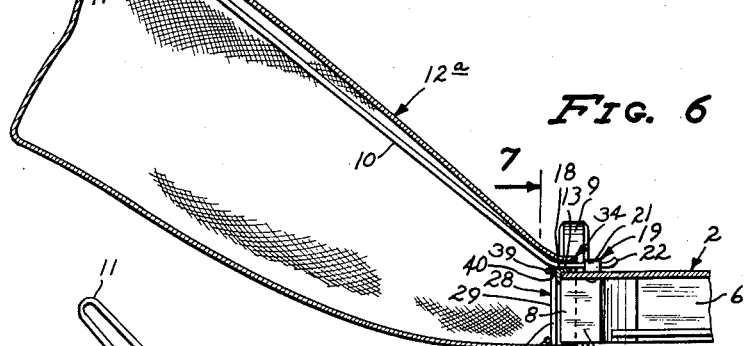
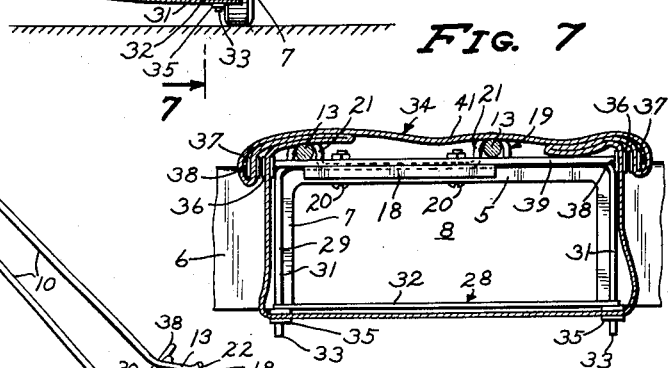
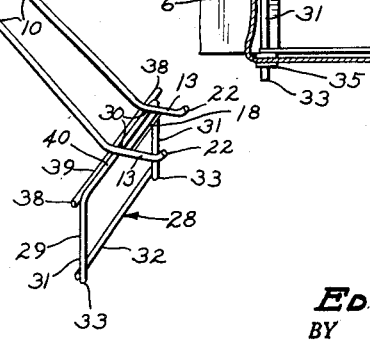
INVENTOR.
EDWIN P. CAMPBELL
BY
*Merchant & Merchant*
ATTORNEYS

United States Patent Office 2,932,146
Patented Apr. 12, 1960

2,932,146

GRASS CATCHER FOR ROTARY MOWERS

Edwin P. Campbell, Minneapolis, Minn.

Application September 29, 1958, Serial No. 763,979

11 Claims. (Cl. 56—202)

My invention relates to grass catching attachments for lawn mowers and more particularly to such attachments for power mowers of the type wherein a cutter blade revolves in a horizontal plane within a top and side wall equipped housing.

Power mowers of the type above described have laterally opening discharge passages for the cut grass and suitable grass catching attachments have not been heretofore devised.

This application is a continuation-in-part of my allowed application Serial No. 698,090, filed November 22, 1957, and entitled "Grass Catcher for Rotary Mowers," now abandoned.

The primary object of my invention is the provision of a grass cutting attachment for power mowers of the type above described which may be readily and securely attached and detached.

A further object of my invention is the provision of a device of the class described which is provided with means for readily emptying the grass catching bag without removing the bag from the attachment.

A further object of my invention is the provision of a device of the class above described which is relatively inexpensive to produce, which is extremely light in weight, but which is rugged and durable in construction.

The above and still further objects of my invention will become apparent from the following detailed specification, appended claims and attached drawings.

Referring to the drawings wherein like characters indicate like parts throughout the several views:

Fig. 1 is a fragmentary view of a conventional power mower illustrating my novel attachment in place thereon;

Fig. 2 is an enlarged fragmentary sectional view as seen substantially from the line 2—2 of Fig. 1;

Fig. 3 is an enlarged sectional view as seen from the line 3—3 of Fig. 1;

Fig. 4 is an enlarged fragmentary perspective view of a part of my novel attachment;

Fig. 5 is a view corresponding generally to Fig. 1 but showing a slightly modified form of my invention;

Fig. 6 is a sectional view taken substantially on the line 6—6 of Fig. 5;

Fig. 7 is an enlarged sectional view taken on the line 7—7 of Fig. 6; and

Fig. 8 is an enlarged view in perspective of a part of my novel attachment.

Referring with greater particularity to the drawings and initially to the structure of Figs. 1 to 4 inclusive thereof, the numeral 1 indicates in its entirety a conventional power mower having a horizontally disposed cutter blade 1a which revolves within a housing 2 and the path of travel of which is indicated by the dotted line 3 in Fig. 1. The power for rotating the cutter blade 1a is derived through the medium of an internal combustion engine 4 mounted on the top wall 5 of the housing 2. The side wall 6 of the housing 2 and the top wall 5 thereof cooperate to define a laterally opening discharge neck 7, the discharge opening therein being identified by the numeral 8.

Substantially all commercially produced mowers of this type include the elements above described in addition to suitable wheels 9 and a handle, not shown.

My novel attachment for mowers of the above type comprises an elongated supporting leg 10, preferably and as shown formed from a single length of wire bent backwardly upon itself to define a relatively narrow outer end 11 for insertion into a grass catcher bag 12, and a relatively wide bifurcated inner end which defines angularly disposed anchoring feet 13.

A frame 14, shown as conforming generally to the shape of the discharge neck 7 and the discharge opening 8 defined thereby, comprises a band-like member 15 and a marginal flange 16, preferably and as shown being endless in form, which projects laterally outwardly from the outer end of the band-like member 15 at right angles thereto. The upper horizontally disposed portion 17 of the frame 14 overlies and is rigidly secured, as by welding or the like, to the outer end portions of the laterally spaced feet 13.

As shown particularly in Figs. 2 and 3, the band-like portion 15 of the frame 14 is of a size whereby same may be snugly slidably received over the discharge neck 7 with the anchoring feet 13 overlying and engaging the top wall 5 defining the discharge neck 7. Straddling the outer end portions of the anchoring feet 13 and depending therefrom is a lip 18 which engages the top wall 5 of the discharge neck 7 immediately adjacent the discharge opening 8 thereof and limits inward movement of the band-like member 15 of the frame 14.

Rigidly but detachably anchoring the feet 13 to the top wall 5 of the housing 2, immediately adjacent the discharge opening 8 and with the frame 14 in encompassing relationship to said discharge opening 8, is a clamping bar 19 which is provided at its intermediate portion with one or more openings alignable with openings in the top wall 5 of the housing 2 and receiving nut-equipped clamping bolts 20. As shown, the opposite ends of the clamping bar 19 are formed to provide downwardly opening saddles 21 for the snug reception of the inner end portions of the feet 13. Preferably and as shown, the extreme inner ends of the feet 13 are upturned as at 22 to discourage outward movement of the feet 13 and parts associated therewith.

It will be noted that when the frame 14 and anchoring feet 13 are secured to the housing 2 as immediately above described, that the bag-supporting leg 10 projects laterally outwardly and upwardly, the reduced open inner end 23 thereof being snugly received over the discharge neck 7 immediately adjacent the discharge opening 8. Preferably and as shown, the reduced inner end portion 23 of the bag 12 is received over the band-like member 15 of the frame 14, outward and upward movements thereof being restricted by the flange 16. The bag 12 is identical in shape to the bag 12a of Fig. 6 and the enlarged upper end portion thereof is preferably provided with a zipper or other suitable closure means 24 to facilitate removal of cut grass gathered therein. Preferably and as shown particularly in Figs. 1 and 3, the restricted open inner end 23 of the bag 12 is provided with a coil tension spring 25 having hooks 26 at its opposite ends for reception in spaced openings 27, said spring 25 increasing the frictional engagement of the restricted inner end 23 with the band-like member 15 of the frame 14.

With respect to the modified form of the invention shown in Figs. 5 to 8 inclusive, all portions thereof are identical with the structure of Figs. 1 to 4 inclusive with the exception of the frame 28 which is hereinafter referred to as a brace frame. The brace frame 28 comprises an inverted U-shaped member 29, preferably and as shown formed from a single length of wire and which, as in the case of the frame 14, is rigidly secured to the outer end portions of the anchoring feet 13, as indicated at 30. The opposite sides 31 of the brace frame 28 are secured together in upwardly spaced relation to their lower end portions by means of a spanner rod 32. The depending extreme lower end portions 33 of the side frame members 31 serve as a function which will immediately hereinafter be explained.

The bag 12a supported by the leg 10 is provided with a mouth 34, the circumference of which is considerably greater than the marginal dimensions of the discharge neck 7. Therefore, for the purpose of snugly securing the mouth 34 of the bag 12a about the discharge neck 7, I provide a pair of circumferentially spaced grommets 35 in the mouth 34, one each adapted to receive one of the downwardly projecting lower end portions 33 of the brace frame 28 when the bag 12a is stretched taut, and circumferentially spaced cooperating pairs 36, 37 of grommets in the mouth 34 of the bag 12a adapted to be received over anchoring fingers 38, one each projecting laterally outwardly in opposite directions from the upper portion of the brace frame 28. As shown in Fig. 8, the fingers 38 comprise opposite end portions of a cross member 39, welded or otherwise rigidly secured to the top portion 40 of the brace frame 28. As shown in Fig. 7, the space between the grommets 35 and the grommets 36 is such as to stretch the mouth 34 of the bag 12a taut therebetween; and the space between the grommets 36 is such that the upper bag mouth portion 41 between the grommets 37 will be substantially taut over the top wall 5 of the discharge neck 7 when that portion of the mouth 34 of the bag 12a between each grommet 36 and 37 is infolded, as indicated in Fig. 7, with each of the pairs of grommets 36 and 37 received over one of the fingers 38.

My invention has been thoroughly tested and found to be completely satisfactory for the accomplishment of the above objects and while I have shown a preferred embodiment thereof, I wish it to be understood that same is capable of modification without departure from the scope and spirit of the appended claims.

What I claim is:

1. A grass catching attachment for lawn mower housing having a lateral grass discharge opening, said attachment comprising an opening defining frame for an elongated bag having an open neck end adapted to embrace said frame, bag supporting means connected to one side of said frame and extending laterally therefrom, and attaching means connected to said frame and extending laterally thereof oppositely to said bag supporting means, said attachment means being adapted to be connected to said mower housing, and said bag supporting means being adapted to be inserted within and to support said bag.

2. The structure as defined in claim 1, wherein said elongated bag has on its supported end portion a closable opening to facilitate removal of collected grass.

3. The structure defined in claim 1 in which said frame comprises a band-like member adapted to surround said discharge opening and an angular marginal flange on the outer end of said band-like member, the reduced inner end of said bag snugly encompassing said band-like member and said marginal flange restricting outward movements of said restricted inner end with respect thereto.

4. The structure defined in claim 3 in which said supporting leg is bifurcated and in which said means comprises foot portions integrally formed with the lower ends of said bifurcated leg.

5. The structure defined in claim 4 in which said foot portions are secured to the upper limits of said band-like member and overlie the top wall element of said housing.

6. The structure defined in claim 5 in further combination with a depending lip straddling said foot portions and limiting inward movement of said band-like member with respect to said discharge opening.

7. A grass catching attachment for power mowers of the type wherein a cutter blade revolves in a horizontal plane within a top and side wall equipped housing, and in which said side and top walls cooperate to define a laterally opening discharge neck, said catcher comprising an elongated supporting leg having a foot portion adapted to overlie the top wall of said housing in closely spaced relation to the discharge opening in the wall thereof, an inverted U-shaped brace frame rigidly secured to said leg and depending therefrom in outwardly spaced relation to said foot portion, a clamping device for detachably securing said foot portion to the top wall of said housing with said frame abutting and encompassing the discharge opening thereof and with said supporting leg projecting generally upwardly and outwardly therefrom, a bag adapted to be supported by said leg, and means associated with the mouth portion of said bag for detachably snugly securing the mouth of said bag about said discharge neck.

8. The structure defined in claim 7 in which said last-mentioned means includes the lower ends of said U-shaped frame projecting below the discharge neck, a pair of anchoring fingers one each projecting laterally outwardly in opposite directions from the upper portion of said frame, a pair of circumferentially spaced grommets in the mouth portion of said bag one each adapted to receive one of the downwardly projecting lower ends of said frame, and circumferentially spaced cooperating pairs of grommets in the mouth portion of said bag adapted to be received over said anchoring fingers when each cooperating pair is aligned.

9. The structure defined in claim 7 in which said leg is bifurcated to provide a relatively wide foot portion at its inner end and a relatively narrow outer end adapted to be received within said bag, and in which said first-mentioned means comprises a clamping bar opposite sides of which engage a fork of said foot portion and a screw extending through the intermediate portion of said clamping bar and having threaded engagement with the top wall of said housing.

10. A grass catching attachment for a lawn mower housing having a lateral grass discharge opening, said attachment comprising an opening defining frame for an elongated bag adapted to embrace said frame, bag supporting means being connected to at least one side of said frame at an intermediate portion thereof, one end portion of said supporting means having means for attachment to said mower housing, and the other end portion of said supporting means being adapted to be inserted in and to support said bag.

11. The structure as defined in claim 10, wherein said mower housing has means thereon for detachably receiving said one end portion of said supporting means.

References Cited in the file of this patent

UNITED STATES PATENTS

| | | |
|---|---|---|
| 896,996 | Lane | Aug. 25, 1908 |
| 2,641,100 | Sylvester | June 9, 1953 |
| 2,720,071 | Watanabe | Oct. 11, 1955 |
| 2,856,746 | Machalk | Oct. 21, 1958 |